C. H. HUTCHINSON.
INTERNAL COMBUSTION ENGINE.
APPLICATION FILED DEC. 1, 1919.
1,437,757.
Patented Dec. 5, 1922.
3 SHEETS—SHEET 1.
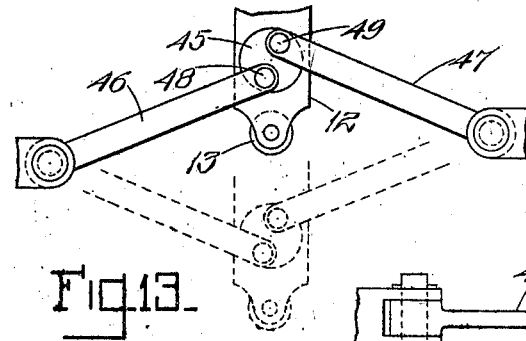
Fig.13.
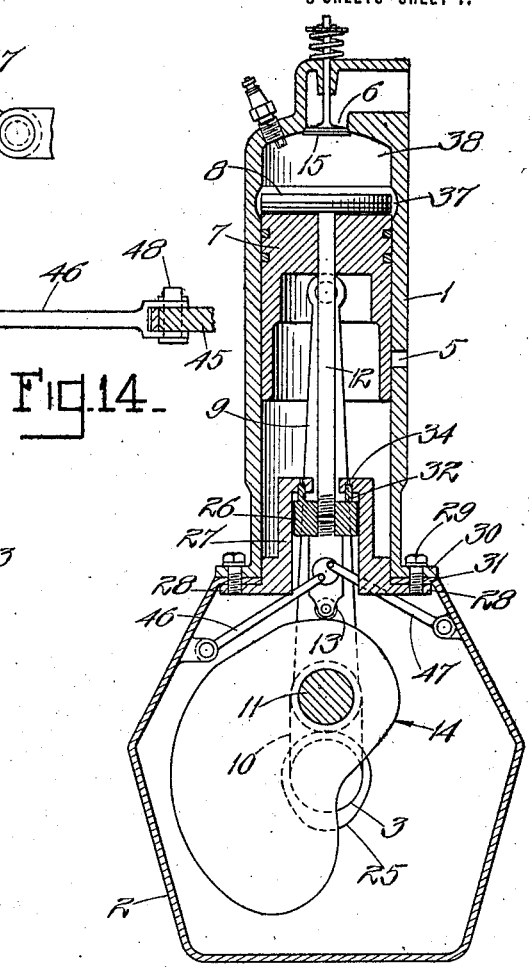
Fig.14.
Fig.1.
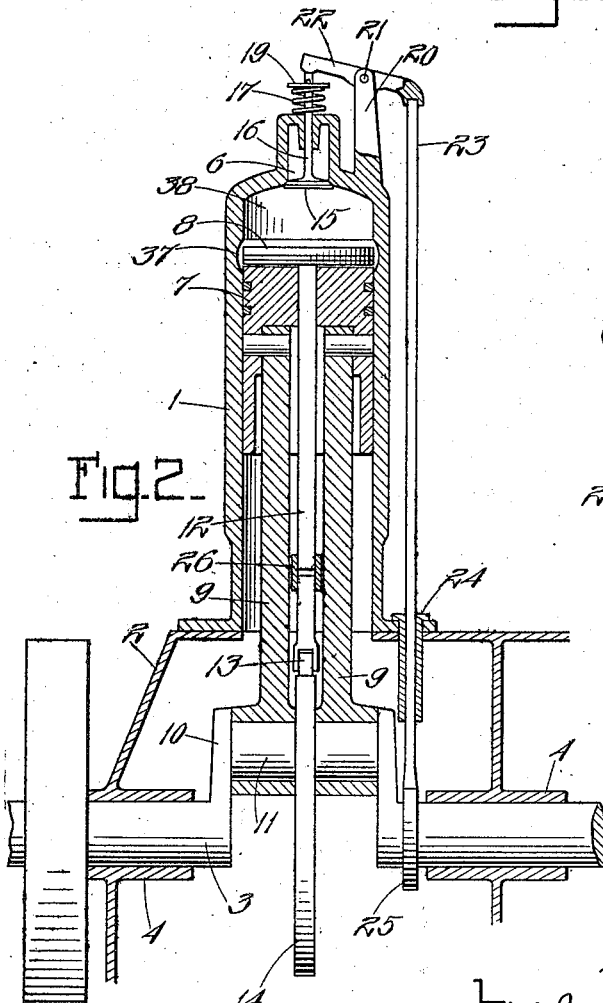
Fig.2.
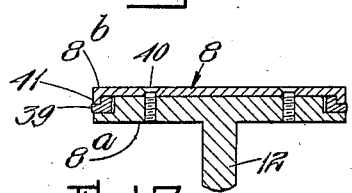
Fig.7.
INVENTOR:
Carleton H. Hutchinson
by Macleod, Calver, Copeland & Dike
Attys.

C. H. HUTCHINSON.
INTERNAL COMBUSTION ENGINE.
APPLICATION FILED DEC. 1, 1919.

1,437,757.

Patented Dec. 5, 1922.
3 SHEETS—SHEET 2.

INVENTOR:
Carleton H. Hutchinson
by Macleod, Calver, Copeland & Dike
Attys

C. H. HUTCHINSON.
INTERNAL COMBUSTION ENGINE.
APPLICATION FILED DEC. 1, 1919.

1,437,757.

Patented Dec. 5, 1922.
3 SHEETS—SHEET 3.

INVENTOR
Carleton H. Hutchinson
by Macleod, Calver, Copeland & Dike
ATTYS

Patented Dec. 5, 1922.

1,437,757

UNITED STATES PATENT OFFICE.

CARLETON H. HUTCHINSON, OF HANOVER, MASSACHUSETTS.

INTERNAL-COMBUSTION ENGINE.

Application filed December 1, 1919. Serial No. 341,713.

*To all whom it may concern:*

Be it known that I, CARLETON H. HUTCHINSON, a citizen of the United States, residing at Hanover, county of Plymouth, and State of Massachusetts, have invented a certain new and useful Improvement in Internal-Combustion Engines, of which the following is a specification, reference being had therein to the accompanying drawings.

The invention relates to a new and useful improvement in internal combustion engines using two pistons within each cylinder or a piston proper and a sub-piston.

One object of the use of a main piston and a sub-piston is to bring about a more thorough atomization of the fuel so as to put it into condition to be thoroughly vaporized and to cause instant explosion as soon as it is prepared so as to prevent condensation.

In engines of this character heretofore made, the sub-piston and the actuation of the exhaust valve have been controlled by the use of link motion, gears and levers, cam shafts and rocker arms. One object of the present invention is to control the sub-piston and exhaust valve directly from the crank shaft and to eliminate the use of gears, separate cam shafts, rocker arms, and link motions, and one feature of this invention consists in the use of cams or eccentrics or similar devices mounted directly on or formed integral with the crank shaft to control the sub-piston and the exhaust valve. By the use of the cams mounted on the crank shaft a more positive control is given to the sub-piston and the exhaust valve.

Another feature of the invention relates to the bypass from the cylinder to the combustion chamber. Heretofore flutes in the cylinder walls have been provided for the bypass. A feature of the present invention consists in forming the cylinder with a smooth enlargement of the bore at that portion where the sub-piston is positioned at the time of the explosion, said enlargement being of sufficient extent to form an annular passage or bypass around the sub-piston which gives a more easy passage of the fuel to the combustion chamber and without undue friction.

Another feature of the invention relates to means for reversing the engine and consists in mounting upon the crank shaft a cam which is the reverse of the cam employed for the forward movement and in providing means whereby the cams for the forward movement and for the reverse movement may be readily shifted in position so as to render either one or the other operative at will.

In using the terms piston proper or main piston and sub-piston I have so designated them mainly for the purpose of convenience in distinguishing between the two pistons in describing the invention. By the use of those terms, however, I mean to broadly cover the use of two pistons in one cylinder in which one of said pistons performs the function of compressing the fuel and the other piston performs the functions of suction intake of fuel and scavenging the cylinder.

The invention will be fully understood from the following description when taken in connection with the accompanying drawings, and the novel features thereof will be pointed out and clearly defined in the claims at the close of this specification.

The drawings show the invention as applied only to a single cylinder. It is obvious that it is applicable to a multiple cylinder engine.

In the drawings, Fig. 1 is a vertical cross section of a two-cycle internal combustion engine embodying the invention, showing the piston and sub-piston both at the top dead center in the position at the end of the compression stroke with the exhaust valve closed ready for the ignition.

Fig. 2 is a vertical longitudinal section thereof.

Fig. 7 is a sectional view showing in detail the preferred construction of the sub-piston.

Fig. 13 is a view showing the movable guide for the lower end of the sub-piston stem in various positions.

Fig. 14 is a detail view of one of the levers used in the movable guide construction.

Figure 3:
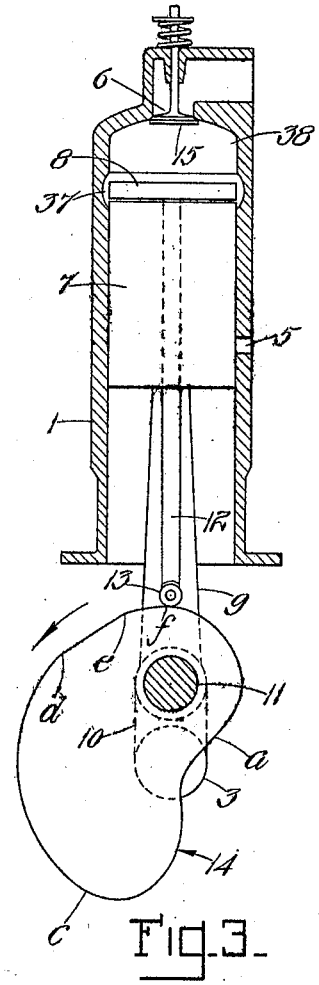
Fig. 3 is a diagrammatic view of the cylinder and pistons and the sub-piston cam, showing the parts at the top dead center same as in Figure 1.

Referring now to the drawings, 1 represents the cylinder and 2 the frame on which the cylinder is supported. The crank shaft 3 is journalled in bearings 4 carried by the frame.

The cylinder 1 is provided with an intake port 5 and an exhaust port 6. Within the cylinder is the main piston 7 and the sub-piston 8. The main piston 7 is connected by a split connecting rod 9 with the crank pin 11 of the crank arms 10.

The sub-piston 8 is mounted on the upper end of a stem 12 whose lower end carries a roll 13, which engages with a cam 14 mounted on the crank pin 11 of crank shaft 3, and having the same axis of rotation as the crank shaft. Said stem 12 passes loosely through an aperture in the main piston 7.

The exhaust port 6 is controlled by a valve 15 having a valve stem 16 which extends upward through the frame and is normally retained closed by a spring 17, one end of which bears against the frame, and the other end of which bears against the disk 19 on the valve stem 16. A rocker arm 22 is pivoted intermediate its ends at 21 to a bracket 20 on the top of the frame. One arm of said lever bears against the upper end of the exhaust valve stem 16 and the other arm of said lever bears on the upper end of a slide rod 23 which slides in a guide 24, the lower end of said rod resting upon the periphery of a cam 25 which is mounted fast on the crank shaft 3. The cam 25 is of such form that it will lift the rod 23, thereby rocking the lever 22 and depressing the valve stem 16 to open the exhaust valve 15 at the proper time in relation to the movement of the piston and sub-piston. Both cams 14 and 25 are carried by the crank shaft 3 and rotate therewith and will maintain absolutely their relative control of movement of the sub-piston and exhaust valve.

In order to steady the sub-piston and also to prevent the roll 13 on the lower end of the sub-piston stem 12 from jumping off the cam when it comes to a sudden stop on its upward stroke, a cushion stop is preferably provided. The preferred form of cushioning mechanism shown in the drawings is as follows:—

Connected with the sub-piston stem is a crosshead 26 which slides between guides 27. Said guides are shown as provided with flange feet 28 secured to the frame of the machine by bolts 29 which pass through flanges 30 projecting from the lower part of the cylinder and through the flange portion 31 of the frame which lies intermediate the flanges 28 of the guide members and the flange 30 of the cylinder. Any other suitable means of connection however may be employed.

Preferably in addition to the guides 27 a movable guide is provided to be attached to the sub-piston rod 12 for the purpose of taking care of any side or end thrust that might be occasioned by the cam pushing against the roll at the end of the sub-piston rod. One form of such guide is shown in Figures 1, 13 and 14 and is as follows:—

The sub-piston stem 12 is formed with a round hole near its lower end in which is inserted a disk 45. Two arms 46 and 47 are pivotally connected with said disk eccentrically thereto. One end of the arm 46 is pivoted to the disk at 48, and at its other end is pivotally connected with the frame 2. One end of the arm 47 is pivotally connected with the disk at 49 and the other end is pivotally connected with the frame. Preferably each arm is forked at the end which connects with the disk and straddles the sub-piston stem 12, thus holding the disk in the round hole. When the sub-piston is in its uppermost position the arms 46 and 47 will incline upwards and the eccentric pivots 48 and 49 will be nearly in a vertical line with each other, one above and one below the center. When the sub-piston moves down, the disk will partially revolve in one direction until the pivot connections with the disk are reverse their respective positions, and the arms swing down below the horizontal, and on the upstroke of the piston the movement of the disk and arms is in the reverse direction.

The crosshead 26 is provided with upwardly extending pins 32 which are adapted to engage with apertures 33 extending upwardly through the lugs 34 of the guide members 27. Said apertures 33 are of sufficient diameter for some distance upward to correspond with the diameter of the pins 32 and each merges into a contracted aperture 35 which extends up through the top of the lug 34. This makes a sort of a dash pot for the pins 32. When they move upward in the apertures 33 they will compress the air which will be forced slowly through the smaller apertures 35 thus producing a cushioning effect on the sub-piston stem.

Figure 10:
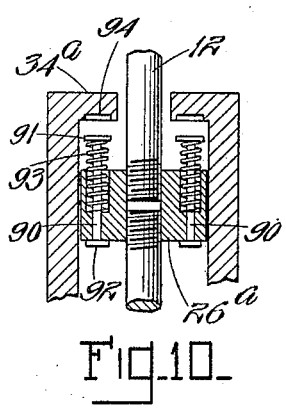
Fig. 10 is a sectional view showing a modified form of cushioning device.
Figure 6:
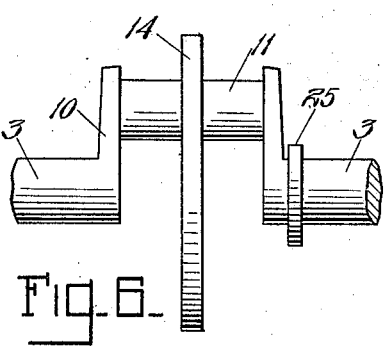
Fig. 6 is a detail view of the crank shaft with the cams for controlling the sub-piston and the exhaust valve.
Figure 9:
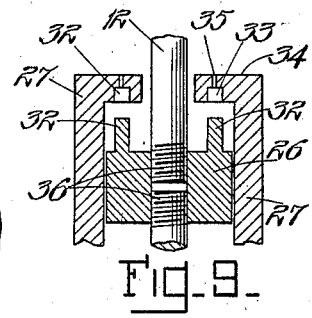
Fig. 9 is a sectional view showing the preferred means for cushioning the upward movement of the sub-piston.

In the modified form of cushion shown in Figure 10 the cushioning effect is obtained by a spring. The crosshead 26$^a$ is formed with vertical apertures or counter bored holes in which the pins 90 are slidably held. The pins are each formed with two heads 91, 92. A spring 93 surrounds the pin, the lower end being seated upon a shoulder in an enlarged portion of the aperture. The upper head of the pin is normally held above the crosshead by the spring. When the sub-piston moves upward the upper head 91 of the pin strikes against the under side of the lug 34$^a$ and yields on its spring seat. Preferably the lug is formed with a recess 94 to receive the upper head of the pin on its impact.

For convenience in assembling the sub-piston stem with the crosshead, the stem is preferably made in two sections in alignment with each other, each having threaded adjacent ends 36 which are threaded into a tapped-out aperture in the crosshead 26, said crosshead 26 thus serving to unite the two sections of the piston stem together. By this form of construction the sub-piston stem can be adjusted in length.

The cylinder 1 is formed with an enlargement of its bore at the entrance to the combustion chamber, forming an interior annular groove 37 which is concaved, as shown in Figure 1. This groove is located in the side of the cylinder against the periphery of the sub-piston at the top of its stroke, and is of somewhat greater width than the thickness of the sub-piston, so that it affords a bypass to the combustion chamber 38 above the sub-piston from the chamber below the sub-piston.

Means are provided to prevent the piston ring from springing out of the groove in the sub-piston when it comes up into the bypass. The sub-piston is formed of two disks 8$^a$ and 8$^b$ between which the piston ring 39 is clamped by screws 40. The piston ring is L-shaped in cross section, as shown in Figure 7, and the upper disk 8$^b$ is formed with a lip 41 which engages with the piston ring 39. The lower edge of the sub-piston ring is rounded so as to permit an easy entrance to the main bore of the cylinder.

Figure 8:
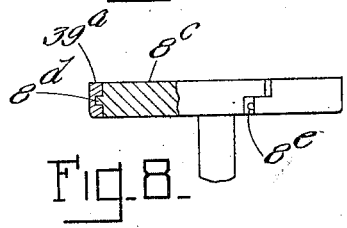
Fig. 8 is a sectional view showing a modified form of sub-piston head.

In Figure 8 there is shown a modified form of sub-piston head. The head 8$^c$ is formed as one solid piece having an annular tongue 8$^d$ projecting laterally from the middle of its periphery. A split ring 39$^a$ grooved on its inner periphery is sprung over the head 8$^c$ until the tongue 8$^d$ engages with the groove in the ring. The ring is formed with a lap joint and the head is provided with a pin 8$^e$ projecting from its periphery into the space between the ends of the ring to prevent the ring from creeping. The lower edge of the ring is rounded for the same reason as described in connection with the ring shown in Figure 7.

Figure 11:
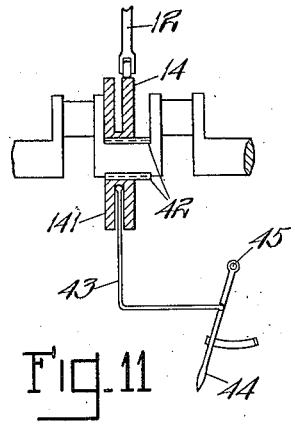
Fig. 11 is a detail view showing the use of a reverse acting cam and the shifting mechanism in combination with the direct cam.
Figure 12:
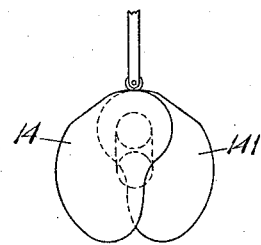
Fig. 12 is an elevational view of the double cam shown in Figure 11.

As shown in the drawings, the crank shaft is intended to turn counter-clockwise during the forward drive and the cam 14 is shaped to actuate the sub-piston in proper sequence of movement to attain this result. I have provided means whereby the reverse drive may be given by simply shifting the cam 14 out of operative position and shifting another cam into operative position on the same crank shaft. Such form of construction is shown in Figures 11 and 12. The cam 14 operates on the forward drive as already described and the cam 141 operates for the reverse drive. Preferably the cams 14 and 141 are united together or are formed out of one piece as a double cam. The cam 14 is shaped just the same as the cam 141 except that it faces in the reverse direction, that is to say one might be called a right-hand cam and the other might be called a left-hand cam. They are rigidly connected together and slidably mounted on the crank shaft by means of keys 42. Connected with the hub of the cam is an arm 43 pivotally connected with a switch lever 44 which is pivoted at 45 as a center. By swinging the lever 44 on its pivot 45 the double cam 14—141 may be moved axially on the crank shaft. As shown in Figure 11 the cam 14 is in operative engagement with the stem of the sub-piston. By shifting the lever 44 to the right, as viewed in Figure 11, the cam 14 will be moved bodily to the right to bring the cam 141 into operative relation with the roller on the stem of the sub-piston. It will be noted that the two cams 14—141 are side by side or offset from each other so that when one is in operative position the other will be out of operative position.

In the operation of the two-cycle engine, assume that the parts are in the position shown in Figures 1, 2 and 3, at the top of the dead center, and that there is a charge of gas in the combustion chamber already compressed by the last upstroke of the piston. It is now time for the explosion and assume that the charge is now fired.

Figure 4:
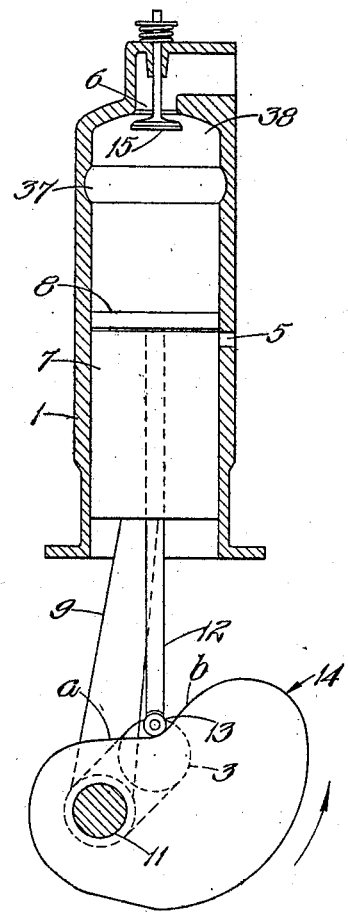
Fig. 4 is a similar view of the parts shown in Figure 3 showing the position within 45° of the bottom dead center when both pistons have been driven down by the explosion and just before the main piston has descended far enough to open the intake port and just before the sub-piston begins to rise for the suction and scavenging movement, and just after the exhaust valve has opened.
Figure 5:
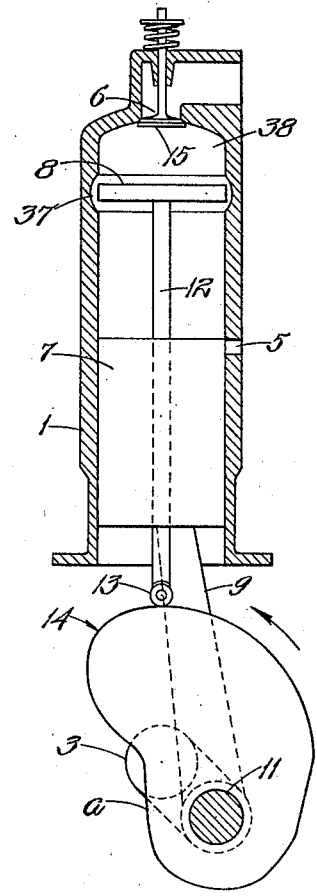
Fig. 5 is a similar view showing the parts after the crank shaft has moved 45° past the bottom dead center in which position the main piston has started on its upstroke and the sub-piston has moved to the end of its upstroke or suction and scavenging stroke, and the exhaust valve has closed.

The parts are constructed so that the crank shaft and cams will move counter-clockwise for the driving stroke. The main piston and the sub-piston will now move downward together on the power stroke at the same rate of speed and without relative movement until they have reached a point where the crank shaft is within 45° of bottom dead center, as shown in Figure 4. At this point the exhaust valve will be opened, the cam 25 which controls the opening of the exhaust valve being mounted on the crank shaft and constructed so that it will actuate the exhaust valve at exactly the proper time. After the exhaust valve is open, the sub-piston is gradually stopped by the cam movement which brings the flat part $a$ in the edge of the cam 14 into engagement with the lower end of the sub-piston rod 12, as shown in Figure 4. Now in the continued rotation of the crank shaft and cam 14, the lower end of the rod 12 rides up on the incline $b$ of the cam, and the sub-piston scavenges the cylinder by forcing out the exploded gases through the exhaust port. While the sub-piston is moved upward to scavenge the cylinder the main piston will have continued moving downward while the crank shaft is turning through the remaining 45° to the bottom dead center, uncovering the intake port 5 and a fresh charge of fuel will be drawn from the carbureter into the space between the sub-piston and the main piston.

Then by the continued rotation of the cam with the crank shaft the main piston will move upward, the sub-piston continuing to draw in fuel until the main piston has moved up far enough to close the intake port. The closing of the intake port will occur when the crank shaft has moved about 45° past the bottom dead center. In the meantime the sub-piston will have moved up to the upper end of its stroke into the enlarged bore 37 of the cylinder. The exhaust valve will be closed by the spring 17 just prior to the entrance of the sub-piston into the enlarged bore of the cylinder. The cam 25 is so shaped that its actuating portion will have moved out of engagement with the exhaust valve rod 23 in time to allow the spring to close the exhaust valve just before the sub-piston enters the enlargement of the bore.

The main piston moves upward during the travel of the crank shaft to the top dead center and comes again into the position shown in Figure 3. This compresses the gas in the cylinder and forces it up through the passage formed by the enlarged bore 37 past the top of the sub-piston into the explosion chamber ready for another explosion.

Preferably the sub-piston is caused to move down a short distance after it has reached the top of its stroke and after the exhaust valve has closed and then to start moving up again before the main piston in its compression stroke overtakes it. This is to enable the main piston which moves faster than the sub-piston to overtake and close up against it while both are moving in the same direction. This is to avoid what is called a knock in the engine. This is accomplished by making a flat place from $d$ to $e$ in the face of the cam, between the concentric portion from $c$ to $d$ and from $e$ to $f$. While the concentric portion $c$ to $d$ is in engagement with the sub-piston rod, the sub-piston will remain at the top of its stroke. While the flat place from $d$ to $e$ engages the rod, the sub-piston will descend a short distance and then move up again. While moving up this last time the main piston will overtake it and they will remain together until after the power stroke when the inclined portion $b$ raises the sub-piston again.

While I have shown in the drawings that the piston and sub-piston travel together as one unit 135° on the explosion stroke, that is, within 45° of the bottom dead center and that the suction and scavenging stroke use the next 90° which is 45° past the lower dead center and during the remaining 135° the sub-piston is either at the top of its stroke or moving on its short down and upstroke to meet the main piston, it is not necessary that the movements should be the exact number of degrees above mentioned.

Figure 15:
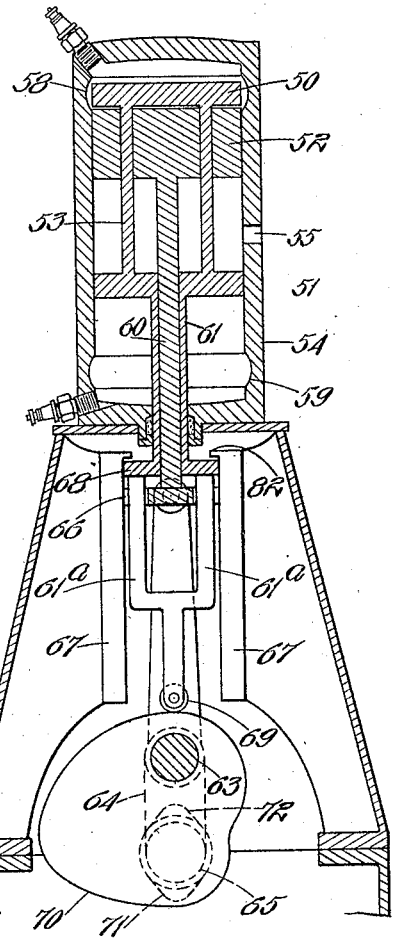
Fig. 15 is a vertical cross section of an internal combustion engine embodying the invention which fires at both ends.
Figure 16:
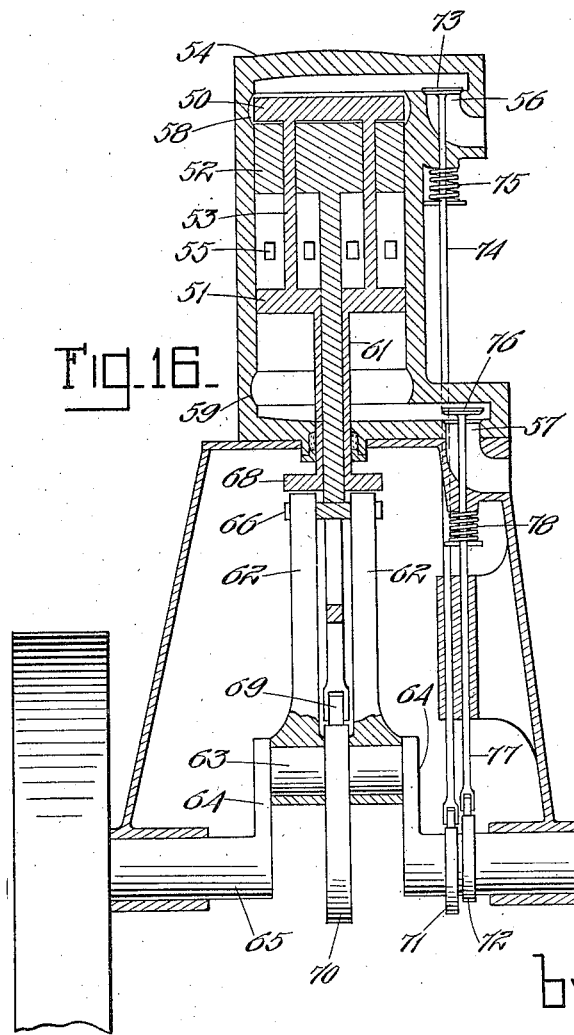
Fig. 16 is a vertical longitudinal section of the engine shown in Fig. 15.

The invention is also adapted to be embodied in the construction of engines which fire at both ends. An engine of this type is shown in Figures 15 and 16. In this construction the sub-piston is formed with two heads 50 and 51, one on the upper side of the main piston 52 and the other on the lower side. The two sub-piston heads are rigidly connected together by pins 53 which pass loosely through apertures in the main piston and are fixedly secured to the two sub-piston heads. The two sub-piston heads are spaced apart far enough so that there is always a chamber between the main piston head and either one or both of the sub-piston heads.

The cylinder 54 is formed with one or more intake ports 55 and is formed with two exhaust ports 56 and 57, one at the upper end and one at the lower end of the cylinder.

The cylinder is also formed with two annular grooves 58, 59 or enlargements of the bore, one at the upper end just below the upper exhaust port and one at the lower end just above the lower exhaust port. Said annular grooves or bore enlargements are located so that at the upper end of the stroke of the sub-piston, the upper sub-piston head 50 will lie in the upper enlarged bore and at the end of the down stroke of the piston the lower sub-piston head 51 will lie in the lower enlarged bore 59.

The sub-piston 51 has a hollow stem 61. The main piston has a stem 60 which passes down through the hollow stem 61 of the lower sub-piston 51 and is pivotally connected with a split connecting rod 62, the lower ends of the two members of which are connected with the crank pin 63 of the crank arms 64 mounted on the crank shaft 65.

The main piston stem 60 is provided with a cross-head 66 at its lower end which slides between guides 67.

The hollow stem 61 of the lower sub-piston head 51 previously referred to is made in two sections which are united together by a crosshead 68, said crosshead 68 being tapped out to form connection with the threaded adjacent ends of the two sections of the sub-piston stem; said crosshead 68 moves up and down between the guides 67.

The lower section of the sub-piston stem 61 is bifurcated below the crosshead forming the two arms 61$^a$. The connecting rod 62 of the main piston stem 60 is split and straddles the sub-piston stem 61.

The lower end of the sub-piston stem is provided with a roll 69 which engages with the periphery of the cam 70. Said cam 70 is mounted on the crank pin 63 but its axis of rotation is the same as that of the crank shaft 65. Mounted on said crank shaft 65 are two cams 71 and 72 which control the two exhausts, said exhaust cams being exactly alike but mounted so that their operative portions are 180° apart. The upper exhaust port 56 is controlled by the valve 73 mounted on a rod 74 whose lower end is provided with a roll which engages with the cam 71 on the crank shaft, said rod being provided with a spring 75 which normally retains the exhaust valve closed.

The exhaust port 57 is controlled by a valve 76 mounted on a rod 77 whose lower end is provided with a roll which engages with the cam 72 which is mounted on the crank shaft 65. Said rod 77 is provided with a spring 78 to normally retain the valve 76 closed.

The side guides 67 are provided at their upper ends with lugs 82 which reach over the upper side of the crosshead 68 to limit its upward movement and prevent the roll 69 on the lower end of the connecting rod from jumping off the periphery of the cam 70.

Figures 15 and 16 show the pistons at the top of the dead center; the main piston and sub-piston are both at the top of their stroke. The fuel has been compressed and the engine is now all ready for the explosion. On the explosion stroke the main piston and the sub-piston travel downward as one unit until the lower end of the sub-piston 51 has scavenged the lower end of the cylinder in which the previous explosion has taken place, this scavenging action driving the previously exploded gases out through the lower exhaust port 57. This downward movement of the two pistons together will continue until the lower sub-piston head 51 comes into the lower enlarged bore 59, and in the meantime the exhaust 57 will have become closed. A new charge will have been sucked through the intake ports 55 into the compression chamber between the main piston 52 and the lower sub-piston 51. Before the lower sub-piston reaches the enlarged bore 59, the main piston 52 will have closed the intake ports 55, and after the lower sub-piston has reached the end of its lowermost stroke the main piston will continue its descent compressing the charge in the lower end of the cylinder between the main piston and the sub-piston, and when it reaches the lower dead center it will have forced the fuel around the lower head of the sub-piston into the combustion chamber between the lower end of the cylinder and the lower sub-piston, and the engine is then ready to be fired in the lower combustion chamber.

This produces the type of an engine firing at both ends; in other words, commencing at the top dead center at the explosion stroke, the main piston and the sub-piston travel together as one unit for 90° and then the main piston continues on its movement compressing the fuel that has been taken in between the sub-piston and the lower end of the main piston for another 90°, and then the apparatus is ready for the upstroke.

It is to be seen that in the type of engine last described the explosion repels the sub-piston so that it will have a complete scavenging and suction stroke without the aid of the lift of the cam. In other words the movement of the sub-piston is accomplished by the power received from the explosion, and the cam serves rather as a guide to hold the sub-piston in proper position on the compression stroke during which the charge is forced through the enlarged bore in the cylinder wall into the explosion chamber. The construction last above described is adapted for use in either the horizontal or vertical type.

The use of the sub-piston brings about a more complete combustion, the fuel which has entered the cylinder through the intake port being compressed between the two pistons, and as the two pistons come together the fuel is shot through the enlargement in the cylinder wall, thereby bringing about a thorough atomization of the fuel and placing it in position to be instantaneously vaporized, the fuel being fired immediately after it is ready and giving no chance for condensation. The formation of carbon is practically eliminated as the combustion of fuel is nearly perfect.

The smooth enlargement of the bore in the cylinder wall gives a free passage, and there are no crevices in which the carbon can collect as is the case when flutes are employed to make a large number of small passages or when inserted rings are employed containing one large flute or a series of smaller flutes. My construction is a great improvement on the use of the fluted passages in the above respect. Also by the use of the fluted passages or inserted rings having one large flute or a series of flutes there are liable to be hot spots caused by carbon collecting in the crevices of the inserted rings or by carbon accumulating in the flutes, and there is a tendency to make the engine pre-ignite at high speed. My improved construction also brings about a large saving in the cost of construction and is simple and easy to make.

By the use of the sub-piston as above described in accordance with my invention, it is possible to use considerable more air than has been possible in engines constructed as heretofore made, and this brings about a more perfect combustion.

The construction of the packing or piston ring for the sub-piston as hereinbefore described, will have a good tight running fit when the sub-piston is below the enlarged bore in the walls of the cylinder and while in the enlarged bore near the head it will retain its usual place without springing out, and by reason of its rounded lower edge it has an easy entrance to the cylinder bore as previously described.

By placing the cams on the crank shaft or making them a part of the crankshaft itself there is produced a much more easily balanced engine.

It is common practice to counterbalance crank shafts by a special counterweight. In the form of construction embodying my invention the cam itself acts as the counterbalance.

By the use of a crank shaft having a cam attached thereto for the sub-piston of each cylinder after the manner of my invention, the cam acts as a direct positive control to the sub-piston and the sub-piston has a scavenging and suction stroke as complete as is accomplished by a four-cycle engine.

By the use of the crank shaft having the two cams on the central axis between two crank arms and with the use of the shifting arrangement, it is possible to run the engine at the same speed, either forward or backward without the use of a reverse gear, and the same principle may also be embodied in an engine of the type which explodes twice at each revolution.

By the use of the double cam and the reverse lever so that the cam may be shifted backwards and forwards longitudinally on the crank shaft, so as to bring either one or the other of the cams as desired into operative position, the engine may be reversed so as to run in either direction at the same rate of speed.

What I claim is:—

1. An internal combustion engine having a cylinder, two pistons movable in said cylinder, a crank shaft, two cams mounted on said crank shaft to rotate therewith, and being slidable axially thereon, means for moving said cams axially on said crank shaft, intermediate means whereby either one of said cams at a time may control the movement of one of said pistons according to the position of the cams on the shaft, and means for shifting the cams on the shaft to bring either of said cams at the will of the operator into operative position, one of said cams being shaped to control the piston to make a forward drive, and the other cam being shaped to control the piston to give a reverse movement to the engine.

2. An internal combustion engine having a cylinder provided with inlet and exhaust ports, a main piston and a sub-piston movable in said cylinder and movable relatively to each other, the sub-piston being located between the main piston and the exhaust port, a crank shaft, intermediate means whereby the crank shaft controls the movement of the main piston, a cam mounted on said crank shaft, intermediate means whereby the said cam actuates the sub-piston to make a scavenging and suction stroke after the explosion, the intermediate actuating mechanism connected with the main piston being so timed with relation to the operative surface of the cam that the sub-piston will move on its scavenging and suction stroke before the main piston moves on its compression stroke, said cam being formed with a variation in its surface so located that after the sub-piston has completed its scavenging and suction stroke the cam will cause the sub-piston to move in a direction toward the main piston during a part of the compression stroke of the main piston, and then before the sub-piston meets the main piston the cam will cause the sub-piston to reverse its direction and move again toward the combustion chamber while the main piston continues its movement and overtakes the sub-piston while both are moving in the same direction.

3. An internal combustion engine having a cylinder, a main piston and a sub-piston reciprocable within said cylinder, a crank shaft, operative means connecting said crank shaft with said main piston, a double cam mounted on said crank shaft, said sub-piston having a stem which is adapted to engage with either one of said cams, said cams being movable axially on said crank shaft, and means for shifting said cams so as to bring one or the other at will into operative relation to the stem of the sub-piston, one of said cams being adapted to actuate the sub-piston in the reverse relation to the other cam in such manner that one controls a forward drive and the other of said cams controls a reverse driving movement of the engine.

4. An internal combustion engine having a cylinder, a piston and a sub-piston both slidable within said cylinder and movable relatively to each other, a crank shaft, means whereby the crank shaft actuates the main piston, two cams mounted on said crank shaft and slidable thereon, said sub-piston being provided with a stem which is adapted to engage with one or the other of said cams according to the position of the cams on the crank shaft, means for bringing one or the other of said cams into operative position, said cams having operative faces similar to each other but reversely disposed with relation to each other in such manner that when one of said cams is in position to engage the sub-piston stem the engine will be actuated to cause a forward drive and when the other cam is in position to engage the sub-piston stem, the engine will be actuated to give a reverse drive.

5. An internal combustion engine having a frame, a cylinder, a piston and a sub-piston both slidable therein and movable relatively to each other, a crank shaft, means connecting the crank shaft with the main piston whereby the rotation of the crank shaft actuates the main piston, a cam mounted on the crank shaft, a stem connected with the sub-piston and engaged by said cam whereby the said cam controls the movement of the said sub-piston, and a guide for the lower end of said sub-piston stem, said guide comprising a rotary disk mounted in said sub-piston stem, and two arms, one of which is pivotally connected at one end with said disk eccentrically thereto, the other end of said arm being pivotally connected with the frame, the second arm being pivotally connected with said disk eccentrically thereto diametrically opposite the eccentric connection of the first arm, the other end of said second arm being pivotally connected with said frame on the opposite side of the axis of said sub-piston stem from the pivot connection of the first arm with the frame.

6. An internal combustion engine having a cylinder, a piston and a sub-piston both slidable therein and movable relatively to each other, a crank shaft, means connecting the crank shaft with the main piston whereby the rotation of the crank shaft actuates the main piston, a cam mounted on the crank shaft, a stem connected with the sub-piston and engaged by said cam whereby the said cam controls the movement of the said sub-piston, a crosshead mounted on said sub-piston stem, side guides for said crosshead in its reciprocation and lugs projecting from said side guides which form stops for said crosshead in the upward movement of the sub-piston.

7. An internal combustion engine having a cylinder, a piston and a sub-piston both slidable therein and movable relatively to each other, a crank shaft, means connecting the crank shaft with the main piston whereby the rotation of the crank shaft actuates the main piston, a cam mounted on the crank shaft, a stem connected with the sub-piston and engaged by said cam whereby the said cam controls the movement of the said sub-piston, a crosshead mounted on said sub-piston stem, side guides for said crosshead, pins projecting upward from said crosshead, lugs projecting from the side guides transversely of the path of movement of the crosshead, and a cushion seat for said pins which gives a yielding stop to the sub-piston at the end of its stroke.

In testimony whereof I affix my signature.

CARLETON H. HUTCHINSON.